2 Sheets—Sheet 1.

T. CHRISTIAN.
Wagon-Brake

No. 43,453.

Patented July 5, 1864.

2 Sheets—Sheet 2.
T. CHRISTIAN.
Wagon-Brake
No. 43,453. Patented July 5, 1864.
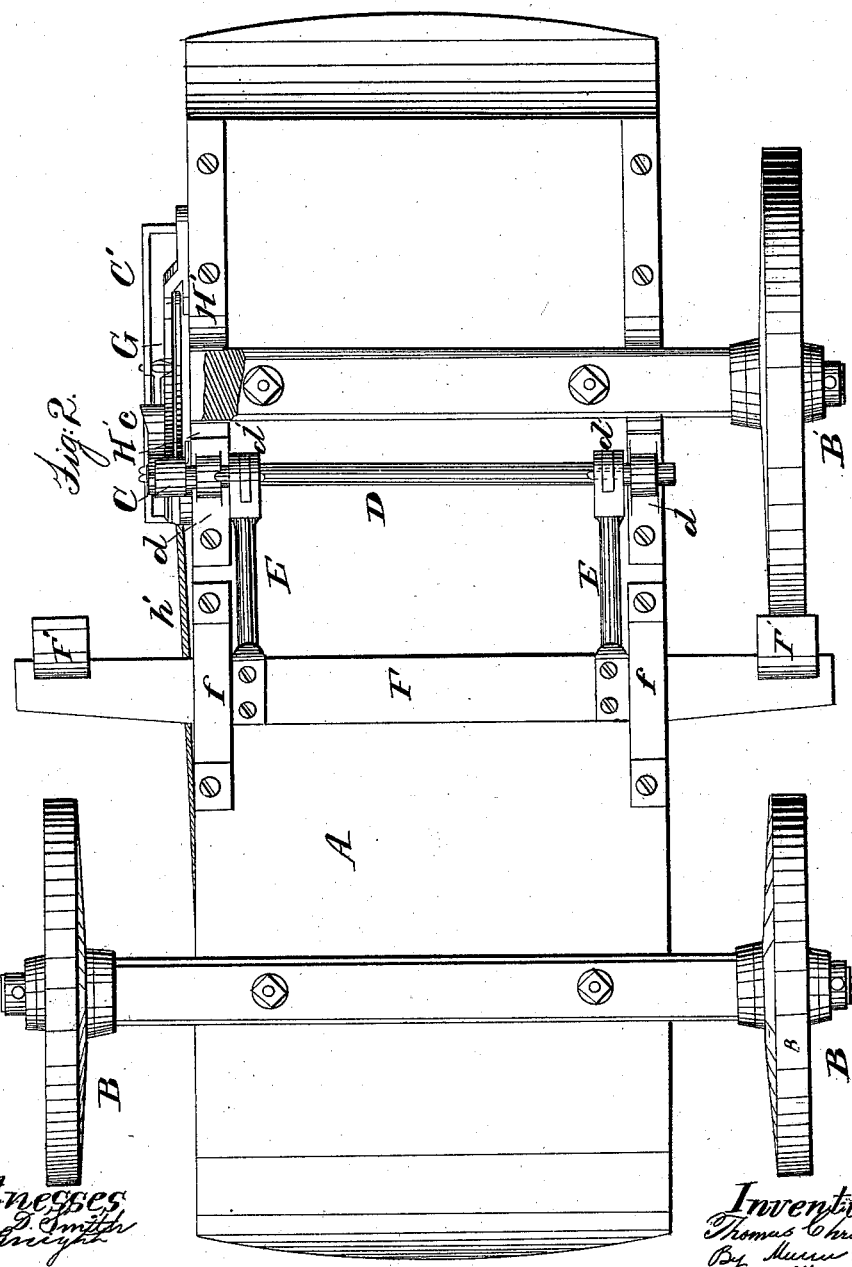

UNITED STATES PATENT OFFICE.

THOMAS CHRISTIAN, OF WASHINGTON, DISTRICT OF COLUMBIA, ASSIGNOR TO HIMSELF AND Z. DE BOW, OF SAME PLACE.

IMPROVEMENT IN WAGON-BRAKES.

Specification forming part of Letters Patent No. 43,453, dated July 5, 1864.

*To all whom it may concern:*

Be it known that I, THOMAS CHRISTIAN, of the city and county of Washington, in the District of Columbia, have invented a new and useful Improvement in Wagon-Brakes; and I do hereby declare the following to be a full and exact description of the same, reference being had to the accompanying drawings, making part of this specification, in which—

Figure 1 is a side elevation of a wagon with my improved brake applied, one of the nigh wheels being removed. Fig. 2 is an under side view of the same, with a portion of the hind axle broken away, to exhibit more clearly the operating parts.

Similar letters of reference indicate corresponding parts in the several figures.

This invention relates to a wagon-brake in which a lever is employed, in connection with a pawl and rack, in such manner that when the lever is in a position to lock the wheels the pawl will take into the teeth of the rack and securely retain the lever in proper position, and when the pawl is withdrawn from the teeth of the rack the lever will be free to have its position changed so as to unlock the wheels.

My improvement particularly consists in arranging the parts in such manner that they operate chiefly by gravitation, and I thereby avoid the use of springs and similar appliances and provide a most simple and effective brake, as will be hereinafter fully explained.

In order that others skilled in the art to which my invention appertains may be enabled to fully understand and use the the same, I will proceed to describe its construction and operation.

In the accompanying drawings, A may represent a wagon mounted upon four wheels, B B B' B', journaled upon axles $b$ $b$, all of which parts may be of common construction.

C represents a lever which is secured upon the end of and adapted to turn a transverse shaft, D, which has its bearings in metallic boxes $d$ $d$, attached to the under side of the wagon. The lever C moves in a guide, C'. On the shaft D are formed lugs $d'$ $d'$, to which are jointed pitman-rods E E, extending from the transverse bar F, which latter carries on its outer ends the rubbers F' F'. The bar F is supported at the under side of the wagon in metallic box-straps $f$ $f$, in which it may be moved away from or toward the hind wheels, B', in order to cause the rubbers F' F' to lock or unlock the same. $c$ represents a pawl pivoted to the lever C in such manner or position that it will drop by the force of gravitation into the teeth of a rack, G. The lever C, when turned to its farthest extent toward the front of the wagon, will still be inclined backward a sufficient distance to cause its center of gravity to be at a point somewhat behind the transverse shaft D, and by this arrangement the lever moves backward naturally, or without the employment of the hand, foot, or a spring, when the pawl $c$ has been withdrawn from the teeth of the rack G and the weight of the lever is such as to cause it to readily turn the shaft D, so as to retract the rubbers F' from the wheels B'—that is to say, when the pawl $c$ is released.

To release the pawl, I provide a pivoted rod or bar, $h$, which occupies a position between the rack G and the side of the wagon, and which operates in connection with a small lever, H, to which said bar $h$ is hinged. The lever H turns upon a pivot in the forward end of the rack G, and moves within a guide, H'. To the upper end of the lever H is attached a cord, $h'$, which may at all times be within convenient reach of the driver. By a slight pull upon the cord $h'$ the driver is enabled to readily turn forward the end of the lever H, which movement of the latter raises the bar $h$, and thus withdraws the pawl $c$ from the teeth of the rack G. When the driver ceases to pull the cord $h'$, the natural tendency of the bar $h$ is to assume a position lower than the teeth of the rack G. As the lever C is turned forward to move the rubbers F against the peripheries of the wheels the pawl falls behind each of the successive teeth, and thus the brake may be thrown on with more or less firmness as circumstances may require.

This invention is simple and may be readily applied to any wagon at little cost, and the parts are so fashioned and arranged as to be secure against all liability to become deranged.

Having thus described my invention, the following is what I claim as new therein and desire to secure by Letters Patent:

The combination of the levers C H, rack G, gravitating arm $h$, and gravitating pawl $c$, all arranged and operating in connection with a wagon-brake, in the manner and for the purposes herein specified.

THOS. CHRISTIAN.

Witnesses:
    OCTAVIUS KNIGHT,
    CHARLES D. SMITH.